March 8, 1932.  H. FÖTTINGER  1,848,616

DEVICE FOR COUPLING OR BRAKING

Filed March 20, 1929

Inventor

Hermann Föttinger

Patented Mar. 8, 1932

1,848,616

UNITED STATES PATENT OFFICE

HERMANN FÖTTINGER, OF BERLIN-WILMERSDORF, GERMANY

DEVICE FOR COUPLING OR BRAKING

Application filed March 20, 1929, Serial No. 348,397, and in Germany March 26, 1928.

The invention relates to appliances which may be used as friction couplings or brakes, and more particularly to an apparatus which permits of generating a very high but variable pressure in accordance with the speed of the rotating members.

An object of the invention is to provide a coupling or braking device in which the actuating pressure of the frictional engaging elements may be gradually varied within wide limits, and in which this actuating pressure is produced by the rotation of the driving member with the assistance of centrifugal force, the operation being constant and automatic.

A further object of the invention is to provide an engaging and disengaging device which can be operated from outside without the use of positive connecting elements, and which is engaged merely by the admission or interposition of friction bodies by a simple and easy operation.

A further object of the invention resides in the provision of means whereby there is secured a continuous change or renewal of the contacting or working faces of the coupling members.

These objects are attained by the interposition of small movable round solid bodies disposed between the friction faces of the driving or primary and driven or secondary members of the appliance, and which members are fixed at a substantially constant distance apart. The mass of round bodies constitutes the frictional connection between said members under the action of centrifugal force and owing to its conjoint plastic property allows of a perfect adjustment and continuous replacement of the friction bodies thereby permitting cooling of the mass. Moreover the friction bodies can be filled into the spaces of the coupling through a stationary intake means which is not in positive connection with the rotating coupling elements. As the operation of the device is essentially automatic the effort required for engaging and disengaging the same is insignificant.

In the accompanying drawings, which forms a part of this specification, several embodiments of the invention are represented by way of examples.

Like numerals denote like parts throughout all figures of the drawings.

Figure 1:
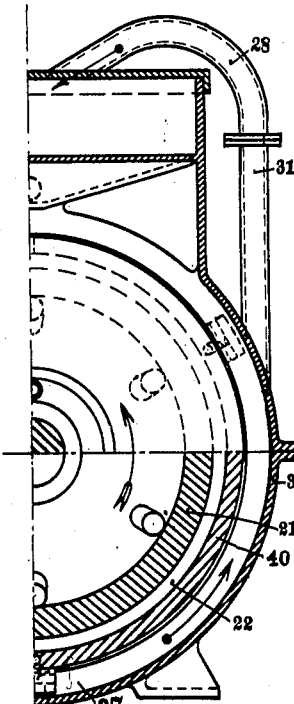
Fig. 1 is an end view of a device according to the invention partly in section on the lines 1—1 of Fig. 2.
Figure 2:
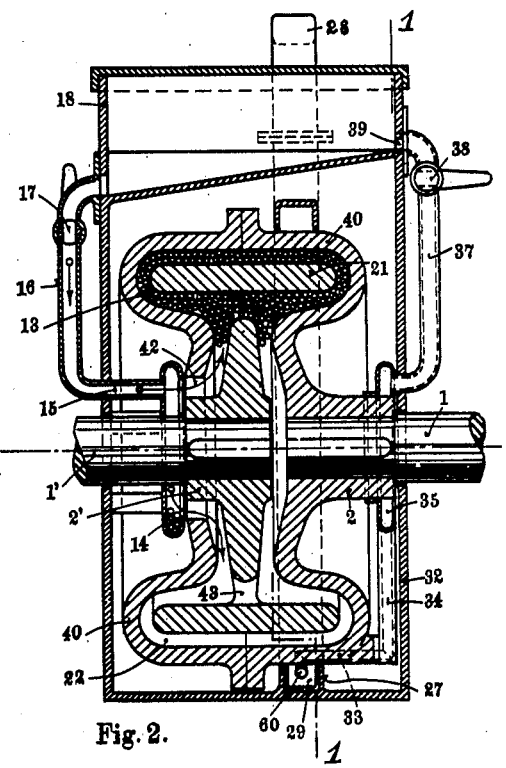
Fig. 2 is a longitudinal sectional elevation of the construction shown in Fig. 1.

In the construction illustrated in Figs 1 and 2, a driving or primary member or body 40 has its hub 2 keyed to a driving shaft 1, while co-axially therewith is a secondary or driven member 21 keyed to a secondary shaft 1'. The primary or driving member 40 is formed as an annular casing enclosing the secondary or driven member 21, an annular clearance 22 of suitable width being provided between the said members. This clearance can be partly or entirely filled with small round and smooth bodies of high specific weight such as steel balls, as shown in Figure 2 above the shafts. In the lower part of Fig. 2 no filling of balls is represented in the clearance for the sake of clearness, in order to show the details of the structure.

The balls contained in the clearance 22 form a movable or plastic mass 13 which presses upon the confining walls of the clearance 22 by the action of centrifugal force, when the primary shaft 1 is rapidly rotating. As the elements of the plastic mass are easily movable the pressure becomes equally distributed throughout the entire mass, so that the contacting faces of the parts 40, 13 and 21, co-operate under high pressure relationship with each other after a preliminary period of slippage and form a friction coupling between the driving member 40 and the driven member 21. The pressure between the plastic mass 13 and the driving and driven members 40 and 21 will vary in accordance with the amount of the movable elements constituting the mass 13. Thus the operation of the device can easily be regulated. Centrifugal force will act upon the mass 13 the same as it would on a column of liquid rotated about a vertical axis.

To permit of distribution of the balls to all points of the clearance 22 and to permit the equalization of the pressure throughout the entire mass 13, perforations, such as 43, are preferably provided at suitable places in the secondary member. On the other hand the friction faces may be formed with irregular or uneven elements and for that purpose, interengaging flanges 48, 50, ribs 47, and partitions or walls 44 and 45 can be employed (see Figs. 3, 4, 5 and 6) in order to increase the area of the operative friction faces.

The relation between the rotating members may be reversed, so that the member 21 can be the driving element and the member 40 the driven element.

The balls are led into the clearance 22 from a hopper 18 carried by the casing 32 and located above the shafts. The balls are fed through a conduit system consisting of a valve 17, tube 16, nozzle 15 and an annular channel 14, and then distributed into an annular opening 42 in the member 40.

Figure 7:
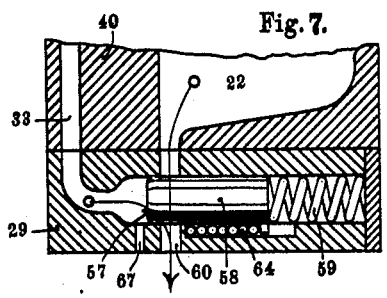
Figs. 7 and 8 are sectional view of details of the construction shown in Figs. 1 and 2.
Figure 3:
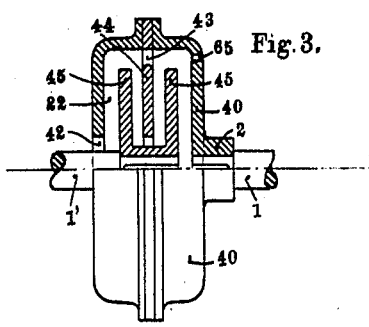
Figs. 3, 4, 5 and 6 are diagrammatical sectional illustrations of modifications of the device.

For uncoupling the shafts, the clearance must be emptied by discharging the balls through suitable openings near the perimeter of the member 40 during rotation. The openings may be controlled by any suitable slide or the like. Preferably, however, a valve controlled by balls is employed. In the example of Figs. 1, 2 and 7 the discharge openings are generally closed by valves 29 or the like. When the valves are opened the ball charge contained in the clearance 22 is thrown out by centrifugal action and rapidly conveyed away so that the members become disconnected.

The slide 58 of the valve 29, illustrated in Fig. 7 with all details, may be moved as required by the plastic mass 13. Balls are supplied through an outlet 39 of the hopper 18, a valve 38 and pipe 37 to an annular passage 35. A pipe 34 and channels 33 in the member 40 are provided connecting the passage 35 with the valve 29. The conduits 33, 34 and 35 rotate with the member 40. A discharge passage 60 is provided leading from the clearance 22 and its outlet is controlled by the slide 58. A spring 59 normally pushes the slide transversely of the opening 60 to close it. The passage 60 is opened by admitting balls through the conduits 38, 37, 35, 34 and 33 to a chamber in front of the face 57 of the slide 58. The pressure of the ball charge moves the slide 58 to the right as viewed in Fig. 7, until the opening 60 is laid bare and the balls can be ejected from the clearance 22 by centrifugal force. Part of the balls fed through the channel 33 will at the same time be discharged through the opening 60, as indicated by the arrows in Fig. 7. In order to keep open the passage 60, balls must therefore be continuously added in the channel 34. When all balls have been discharged from the clearance 22 the supply of balls to the channel 33 will be interrupted, whereupon the spring 59 closes the valve by shifting the piston 58 towards the left, while the balls still contained in the channel 33 are gradually discharged through a small permanently open auxiliary passage 67. This passage is not able to effect a reduction of the pressure as long as the charging depth in the pipe 34 is maintained, but after the make-up of balls has ceased, it permits the conduits 35, 34 and 33 to be completely emptied.

Figure 8:
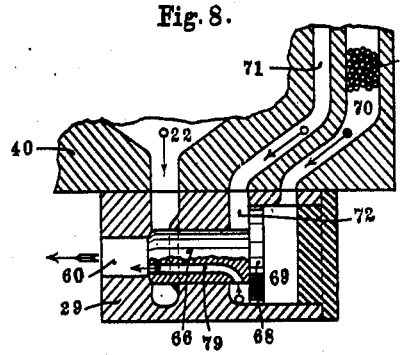
Figures 4, 5, 6:
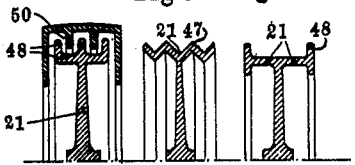

In Fig. 8 the spring 59 is substituted by a pressure chamber 69 which is fed from a passage 70 filled with balls only to a limited depth. The balls act on the rear face of a differential piston 68 which is connected to a slide 66 controlling the passage 60. A chamber 72 at the opposite side of the differential piston 68 can be charged with balls through a passage 71 as hereinbefore disclosed, the depth of the radial column 13 of balls being so selected that the pressure of the balls in the chamber 69 on the back of the piston 68 is overcome, and the slide 66 withdrawn from the passage 60. A longitudinal passage 79 is provided in the slide 66 and forms an open connection between the chamber 72 and the passage 60. The balls in the passage 71 must be supplied permanently as long as the slide 60 is to be withdrawn. After evacuation of the clearance 22 and the interruption of the supply to the channel 71 the balls in the chamber 72 are completely ejected through the passage 79. Then the pressure of the mass of balls permanently remaining in the chamber 69 and the passage 70 moves the slide 66 back into the closing position illustrated in Fig. 8.

The feeding of balls through the channels 70 and 71 is similar to that described in connection with the supply device 33, 34 and 35 of Figs. 1 and 7, except that the two receivers 35 are connected with the passages 70 and 71 respectively, into which the movable tube 37 alternately discharges. If desired, two supply tubes 37 may be provided. The balls should be small in order to reduce the shock when they bounce in the wall of the chute 27. The discharge opening 60 is preferably directed oppositely to the rotation of the device so that the resultant velocity of the balls is reduced. In Figs. 2 and 8 the parts are moving counterclockwise while the balls are discharged from the opening 60 in a clockwise direction.

A permanently open passage 65 (Fig. 3) may be employed in devices of this kind when operated for short periods of time, since the balls are discharged comparatively slowly through the small perforation.

Preferably roller bearings are provided for the slide 58 for reducing the friction of parts under high pressures, as indicated at 64 in Fig. 7.

The discharged balls are received by a chute 27 attached to the casing 32 and returned by their momentum to the hopper 18 through branches 31, 28 (Figs. 1 and 2). The discharge of the balls may be effected at a high rate by the provision of a number of valves 29 on the circumference of the member 40.

In order to prevent the formation of nests where the balls may stick or be otherwise trapped, the balls should not be of equal size and it is preferred to curve, break or incline the walls of the clearance and channels, as illustrated in Fig. 2.

To reduce wear, the walls of the chambers should be made of softer material than the balls. The balls should have a coating of oil or grease and all chambers and channels contacting with the balls should be permanently washed with lubricant in order to prevent dry friction.

The operation of the device depends not only on the velocity of rotation but also on the depth of radial filling of the chamber 22. An easy regulation can therefore be attained by varying the level of the mass contained in the clearance between the primary and secondary members, so that the pressure head of the radial column of the plastic mass 13 may readily be made to conform to the desired effect.

A suitable shape of the column is obtained by the special forming of the members of the appliance and the clearance made between them with walls traced out in revolution.

The appliance can be used as a coupling or for other purposes.

As disclosed in the foregoing specification, the invention can be performed in different ways. It is therefore not limited to the examples illustrated for purpose of examples, but what I claim is—

1. In a frictionally engaging appliance, the combination with a primary rotary member, of a secondary member, a movable charge of small rigid bodies and means responsive to centrifugal force for introducing said bodies between said members.

2. In a frictionally engaging device, the combination with a primary rotary driving member, of a secondary member, said members conjointly defining a clearance therebetween, interengaging non-contacting projections on said primary and secondary members, a movable mass of small rigid and heavy bodies, and a conduit for conveying the bodies from outside, said device having a central annular opening for admitting the bodies between the primary and secondary members, and an outlet for the discharge of the mass of bodies.

3. In a frictionally engaging appliance, the combination with a primary rotary driving member, of a secondary member, the members being spaced from each other, a movable mass of small rigid bodies between the said primary and secondary members to frictionally interconnect said members under the action of centrifugal force, means for conveying the bodies into the clearance of the members, and a discharge valve controlled by the mass of bodies.

4. In a frictionally engaging appliance, the combination with a primary rotary driving member, of a secondary member, being spaced apart from the primary member, one of the members being a casing in which the other is enclosed, a mass of small rigid bodies, means for conveying said bodies to the clearance between the members to frictionally interconnect the said members under the action of centrifugal force, means for admitting to, and other means for discharging the mass of bodies out of the appliance.

5. In a frictionally engaging appliance, the combination with a primary rotary driving member, of a secondary member to be driven by the primary member, the said members being spaced from each other the clearance therebetween extending to the center of the appliance, a charge of small rigid bodies, and means for filling said clearance to different radial depths with said bodies.

6. In a frictionally engaging appliance, the combination with a primary rotatable driving member, of a secondary member acted upon by the said primary member, a movable mass of small rigid bodies adapted to be inserted between the said primary and secondary members and to frictionally interconnect same under the action of centrifugal force, a supply vessel, conduits conveying the bodies to the appliance, said appliance being provided with an annular admission opening for the introduction of the bodies, and an outlet for permitting discharge of the bodies.

7. In a frictionally engaging appliance, the combination with a primary rotatable driving member, of a secondary member acted upon by the said primary member, the said members being spaced apart, a movable charge of small rigid bodies between said primary and secondary members, said device being provided with a central annular feeding opening leading to the interstice between the members, means for regulating the feeding of the bodies, and means for regulating the discharge of the bodies.

8. A device of the class described, including a primary rotary member, a secondary member spaced therefrom to provide a clearance therebetween, said device being provided with an inlet opening near the axis of rotation of said primary member, a reservoir for holding a charge of small rigid bodies, a conduit leading from said reservoir to said inlet opening, and valve means for controlling the flow of said bodies from said reservoir to said clearance.

9. A device of the class described, including a primary rotary member, a secondary member spaced therefrom to form a clearance therebetween, a reservoir above said members, and adapted to hold a charge of small rigid bodies, said device being provided with an inlet opening to said clearance, and disposed near the axis of rotation of said primary member, a conduit leading from said reservoir to said inlet opening, and means for discharging said mass of small rigid bodies from said clearance into said reservoir.

10. A device of the class described, including a primary rotary member, a secondary member substantially enclosing said primary member, and spaced therefrom to form a clearance, said secondary member being provided with an inlet opening leading to said clearance, and disposed near the axis of rotation of said device, an annular channel member concentric with said axis of rotation, and having an opening which alines with said inlet opening, and means for feeding small rigid bodies to said channel member, for entrance through said inlet opening and into said clearance.

11. A device of the class described, including a primary rotary member, a secondary member spaced therefrom to form a clearance therebetween, said device being provided with a discharge opening near the periphery of said clearance, a movable charge of small rigid bodies in said clearance, and valve means actuated in response to centrifugal force for controlling the flow of said charge from said clearance through said discharge opening.

12. A device of the class described, including a primary rotary member, a secondary member spaced therefrom to form a clearance therebetween, a movable charge of small rigid bodies in said clearance, said device being provided with a discharge opening near the periphery of said clearance, valve means actuated in response to centrifugal force. and including a plunger slidably mounted across said discharge opening to control the outflow of said charge from said clearance.

13. A device of the class described, including a primary rotary member, a secondary member spaced therefrom to form a clearance therebetween, a movable charge of small rigid bodies in said clearance, said device being provided with a discharge opening near the periphery of said clearance, and valve means actuated in response to the centrifugal action of an independent mass of small movable bodies for controlling the outflow of said charge from said clearance through said discharge opening.

14. A device of the class described, including a primary rotary member, a secondary member spaced therefrom to form a clearance therebetween, an elevated reservoir containing a mass of small rigid bodies, means for introducing said movable bodies into said clearance to effect the interengagement of said primary and secondary members, said device being provided with a discharge opening near the outer periphery of said clearance, a valve for controlling the discharge of said mass from said clearance through said discharge opening, means for introducing said mass of small rigid bodies from said reservoir to said valve, and means responsive to the centrifugal action of said last mentioned mass on said valve, for controlling the discharge of said mass from said clearance.

15. A device of the class described, including a primary rotary member, a secondary member spaced therefrom to form a clearance therebetween, an elevated reservoir containing a mass of small rigid bodies, means for introducing said movable bodies into said clearance to effect the interengagement of said primary and secondary members, said device being provided with a discharge opening near the outer periphery of said clearance, a channel member encircling said members, and registering with said discharge opening, and means for conducting said bodies from said channel member back to said reservoir.

16. A device of the class described, including a primary rotary member, a secondary member spaced therefrom to form a clearance therebetween, means for introducing a mass of small movable bodies in said clearance to effect the interengagement of said primary and said secondary member, said device being provided with a discharge outlet disposed near the outer periphery of said clearance, a valve including a plunger controlling the discharge of said mass from said discharge outlet, means for introducing an independent mass of small rigid bodies at one end of said plunger, while said members are rotating, whereby under the action of centrifugal force exerted by said last mentioned mass, the plunger will move to uncover said discharge outlet, whereby the evacuation of said clearance is effected.

In testimony whereof I have signed my name to this specification.

Dr. HERMANN FÖTTINGER.